(12) United States Patent
Liao

(10) Patent No.: US 7,212,420 B2
(45) Date of Patent: May 1, 2007

(54) UNIVERSAL SERIAL BUS VOLTAGE TRANSFORMER

(76) Inventor: Sheng Hsin Liao, No. 10, Alley 38, Lane 229, San Chung St., Shulin City, Taipei Hsien (TW)

( * ) Notice: Subject to any disclaimer, the term of this patent is extended or adjusted under 35 U.S.C. 154(b) by 0 days.

(21) Appl. No.: 10/072,921

(22) Filed: Feb. 12, 2002

(65) Prior Publication Data
US 2003/0151938 A1 Aug. 14, 2003

(51) Int. Cl.
*H02M 1/00* (2006.01)
(52) U.S. Cl. .................................................. 363/146
(58) Field of Classification Search ................ 363/144, 363/145, 146
See application file for complete search history.

(56) References Cited

U.S. PATENT DOCUMENTS

| | | | | |
|---|---|---|---|---|
| 5,744,934 A | * | 4/1998 | Wu | 320/111 |
| 5,847,545 A | * | 12/1998 | Chen et al. | 320/138 |
| 5,973,948 A | * | 10/1999 | Hahn et al. | 363/146 |
| 6,061,261 A | * | 5/2000 | Chen et al. | 363/146 |
| 6,111,772 A | * | 8/2000 | Lee et al. | 363/146 |
| 6,733,329 B2 | * | 5/2004 | Yang | 439/518 |

* cited by examiner

*Primary Examiner*—Adolf Berhane
(74) *Attorney, Agent, or Firm*—Rosenberg, Klein & Lee

(57) ABSTRACT

The present invention provides a universal serial bus (USB) voltage transformer, which comprises a main body, a transformer circuit unit, and several connectors. The transformer circuit unit is disposed in or at the inside of the main body. The connectors are electrically connected to the transformer circuit unit directly or via a connection cable. A USB voltage transformer having travel charging function is thus formed. The USB voltage transformer of the present invention can simultaneously charge several portable electronic devices like mobile phones, personal digital assistants, electronic translators, and small cameras.

7 Claims, 10 Drawing Sheets

UNIVERSAL SERIAL BUS VOLTAGE TRANSFORMER

FIELD OF THE INVENTION

The present invention relates to a universal serial bus voltage transformer and, more particularly, to a voltage transformer capable of providing standard voltages to apply to portable electronic devices like mobile phones, personal digital assistants, electronic translators, and small cameras.

BACKGROUND OF THE INVENTION

Along with continual progress of information technology, portable electronic devices such as mobile phones, personal digital assistants (PDAs), and electronic translators have become articles of frequent use in everyday lives of people. General portable electronic devices use chargeable Li batteries, Ni-MH batteries, or Ni—Cd batteries to provide the required electricity.

As shown in FIG. 1, a conventional voltage transformer 10a comprises a main body 11a, which has a transformer circuit unit (not shown) therein. The input end of the transformer circuit unit joins a first plug 12a, and the output end thereof joins a cable 13a. The other end of the cable 13a joins a second plug 14a. The first plug 12a can be plugged into a socket of 110V or 220V alternating current (AC). Through the function of the transformer circuit unit, a direct current is obtained. The direct current is transferred to the second plug 14a via the cable 13a. The second plug 14a can then be plugged into a portable electronic device such as a mobile phone to provide the required electricity.

However, the specification of the above voltage transformer must have various kinds of different designs according to different portable electronic devices. Therefore, a user usually needs to purchase various kinds of voltage transformers of different specifications, hence increasing economic burden to the user and resulting in much inconvenience in use. Moreover, the voltage transformer can only provide the required electricity for a single portable electronic device, and cannot provide the required electricity for several portable electronic devices, hence limiting the usage and also resulting in much inconvenience for the user.

Accordingly, the above voltage transformer has inconvenience and drawbacks in practical use. The present invention aims to resolve the problems in the prior art.

SUMMARY OF THE INVENTION

The primary object of the present invention is to provide a universal serial bus (USB) voltage transformer, which can provide standard voltages to achieve the object of unified specification. It is not necessary for a user to purchase several kinds of voltage transformers of different specifications, hence lessening economic burden to the user and resulting in more convenient use.

Another object of the present invention is to provide a USB voltage transformer, which can simultaneously provide the required electricity for several portable electronic devices, hence resulting in more flexible, practical, and convenient use.

To achieve the above object, the present invention provides a USB voltage transformer comprising a main body, a transformer circuit unit disposed on the main body, and at least a connector electrically connected to the transformer circuit unit. A voltage transformer is thus formed.

The various objects and advantages of the present invention will be more readily understood from the following detailed description when read in conjunction with the appended drawing, in which:

DETAILED DESCRIPTION OF THE PREFERRED EMBODIMENTS

Figure 1:
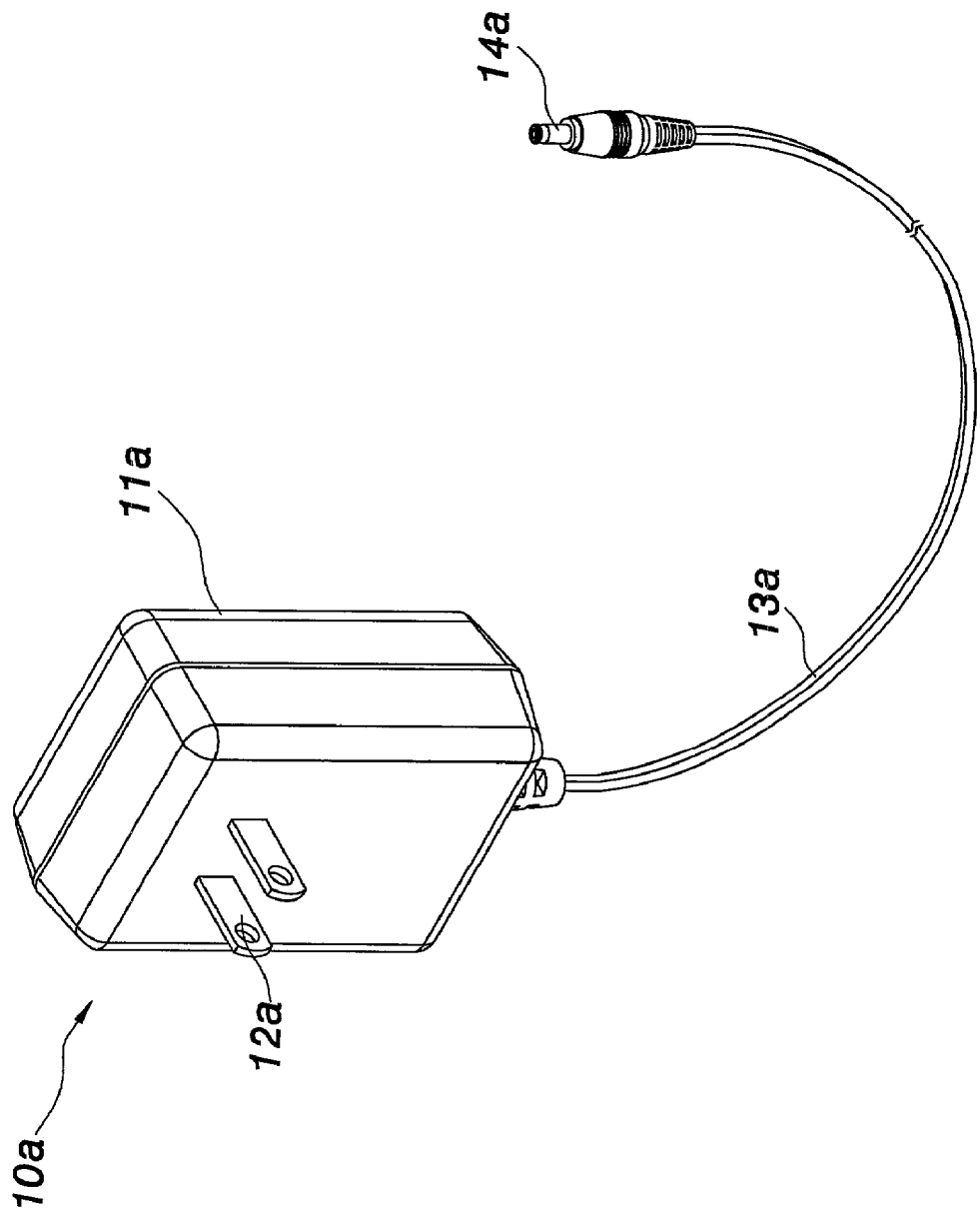
FIG. 1 is perspective view of a prior art voltage transformer.
Figure 2:
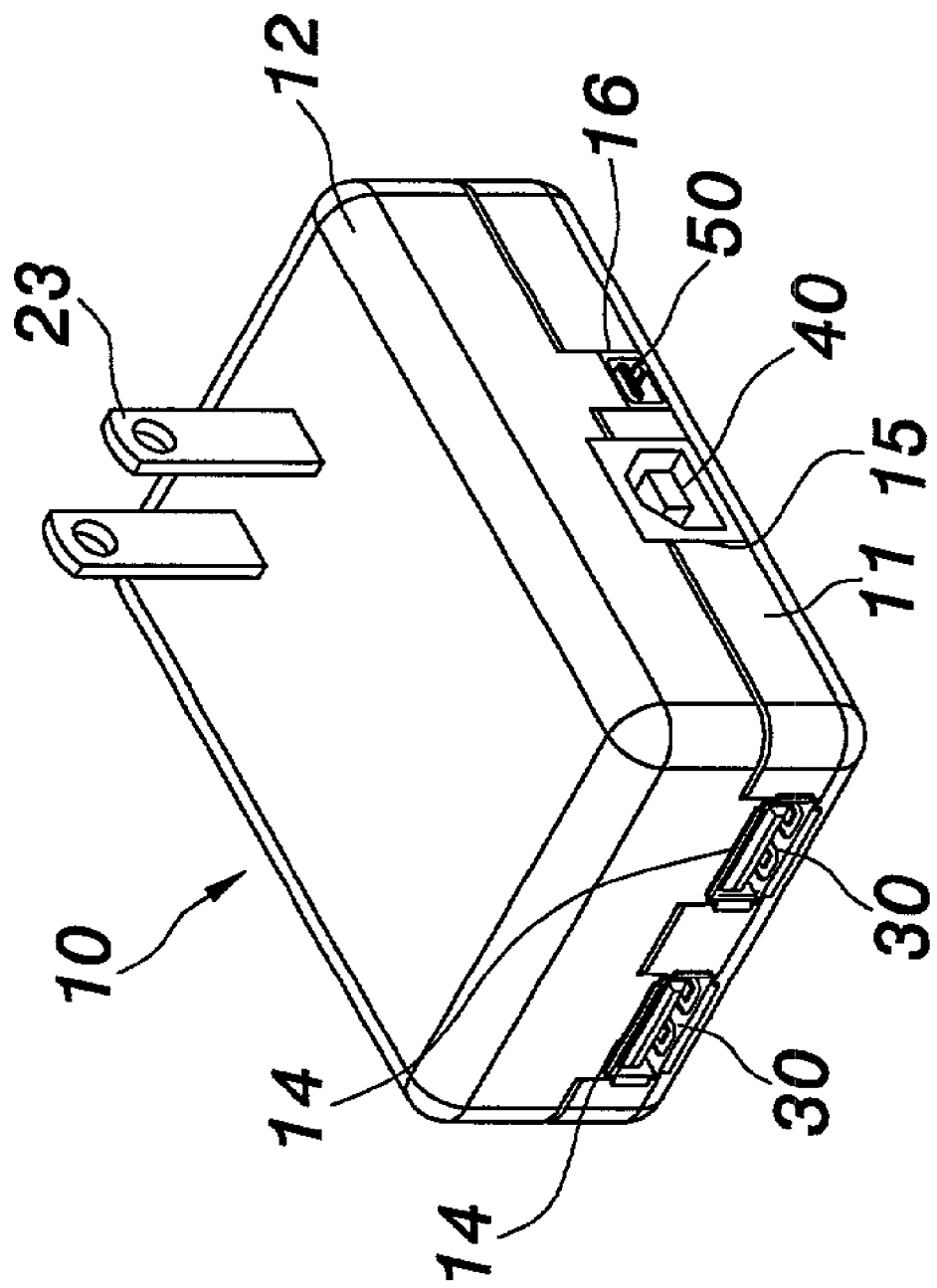
FIG. 2 is a perspective view of a first embodiment of the present invention.
Figure 3:
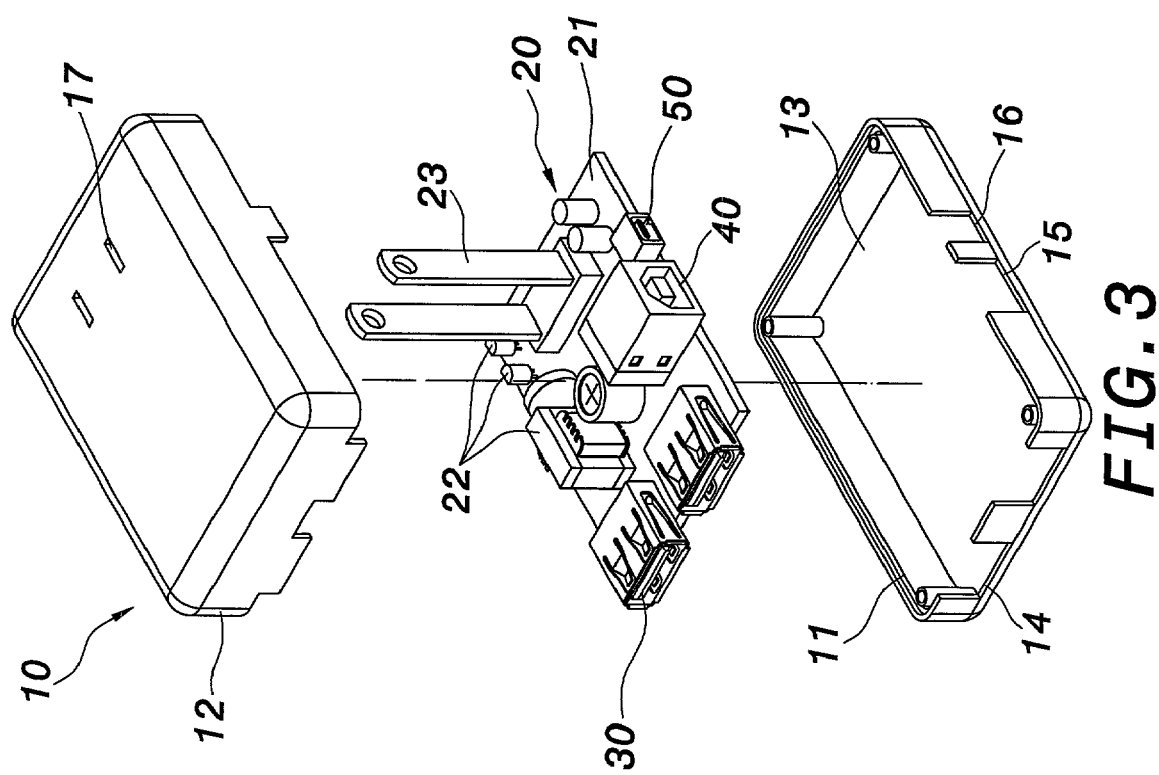
FIG. 3 is an exploded perspective view of the first embodiment of the present invention.

As shown in FIGS. 2 and 3, a voltage transformer according to a preferred embodiment of the present invention comprises a main body 10, a transformer circuit unit 20, and several connectors 30, 40, and 50. The main body 10 is a hollow shell body formed by retaining or screwing a first half body 11 and a second half body 12. The main body 10 has a receiving room 13 therein to receive the transformer circuit unit 20 and the connectors 30, 40, and 50. The transformer circuit unit 20 and the connectors 30, 40, and 50 are disposed on the main body 10. The main body 10 has openings 14, 15, and 16 corresponding to the connectors 30, 40, and 50, respectively.

The transformer circuit unit 20 comprises a circuit board 21 and a plurality of electronic components 22. The input end of the transformer circuit unit 20 joins a plug 23. The connectors 30, 40, and 50 are fixed on and electrically connected to the circuit board 21. The connectors 30, 40, and 50 are connected to the output end of the transformer circuit unit 20. Additionally, the transformer circuit unit 20 can be a linear transformer. The plug 23 passes through a corresponding through hole 17 preset on the main body 10, and protrudes out of the main body 10. The connectors 30, 40, and 50 respectively correspond to the openings 14, 15, and 16 to plug with mating connectors.

The connector 30 is an A-type USB connector, and can be of male or female type. In this embodiment, the connector 30 is of female type, and there are two of the connectors 30 provided. The connector 40 is a B-type USB connector, and can be of male of female type. In this embodiment, the connector 40 is of female type, and there are one of the connector 40 provided. The connector 50 is a mini type USB connector, and can be of male or female type. In this embodiment, the connector 50 is of female type, and there are one of the connector 50 provided. The USB voltage transformer of the present invention is thus formed.

Figure 4:
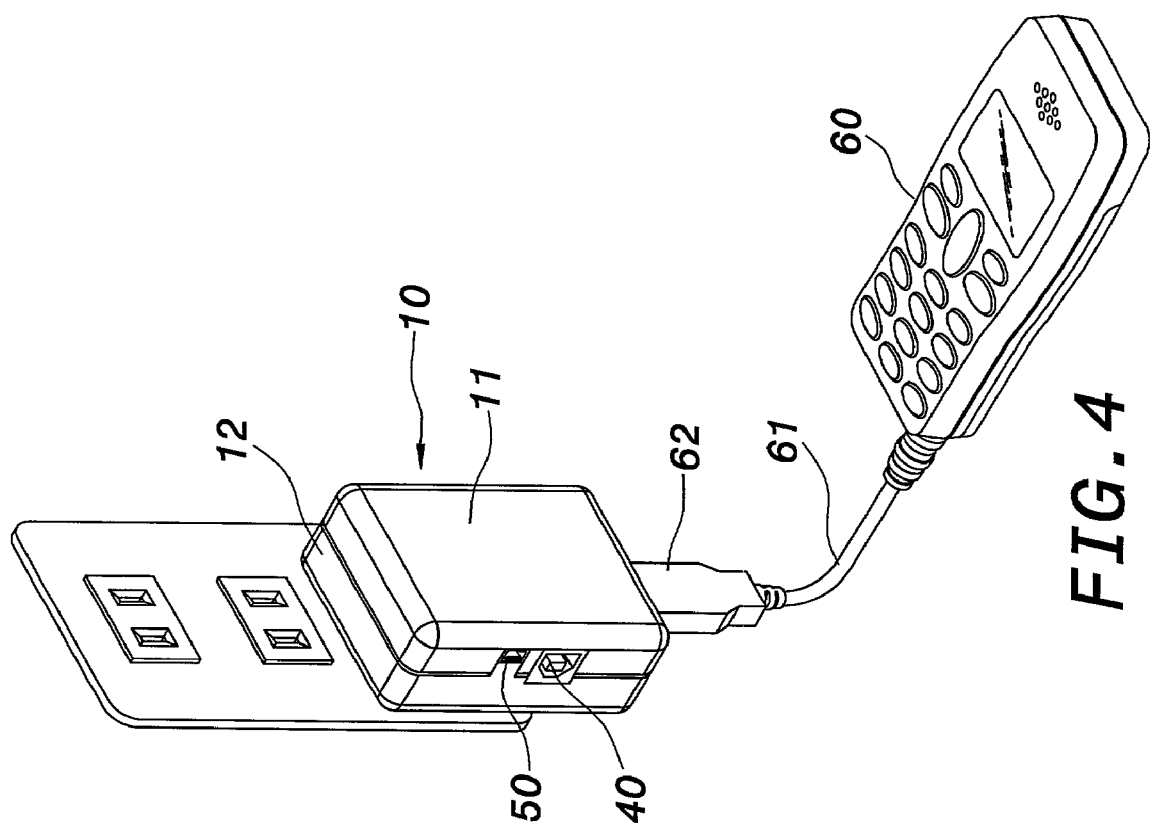
FIG. 4 shows a use state of the first embodiment of the present invention.

Please refer to FIG. 4. The plug 23 can be plugged into a socket of 110V or 220V AC. Through the function of the transformer circuit unit 20, a direct current is obtained. The direct current is transferred to the connectors 30, 40, and 50, which can thus plug with a portable electronic device 60 like a mobile phone. The portable electronic device 60 can plug with the connector 30 via a mating connector 62 at one end of a connection cable 61, thereby providing the required electricity for the portable electronic device 60 to perform charging operation.

Figure 5:
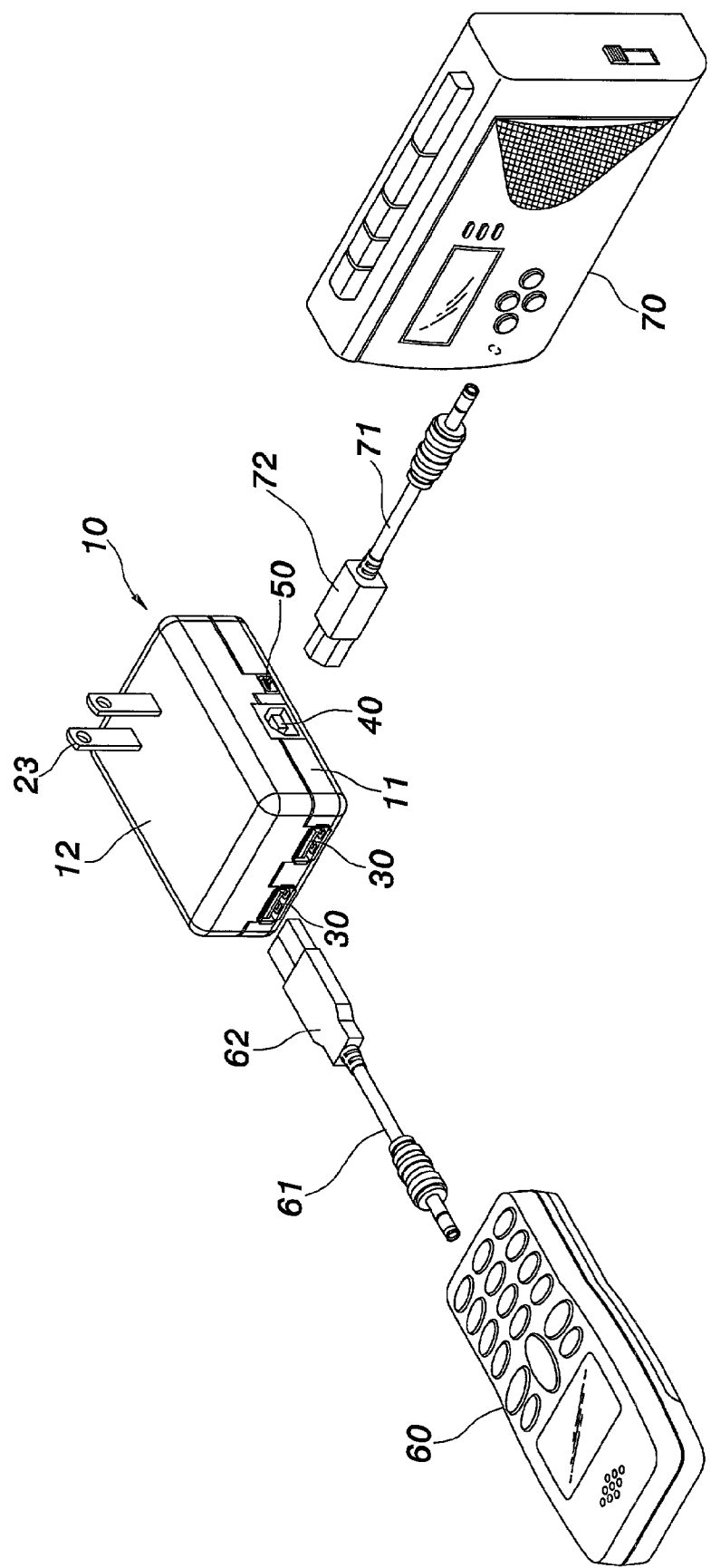
FIG. 5 shows another use state of the first embodiment of the present invention.

Please also refer to FIG. 5. In addition to plugging with the portable electronic device 60 like a mobile phone, the present invention can also plug with another portable electronic device 70 like a walkman, a PDA, or an electronic translator. The portable electronic device 70 can plug with the connector 40 via a mating connector 72 at one end of a connection cable 71, thereby providing the required electricity for the portable electronic device 70.

Figure 6:
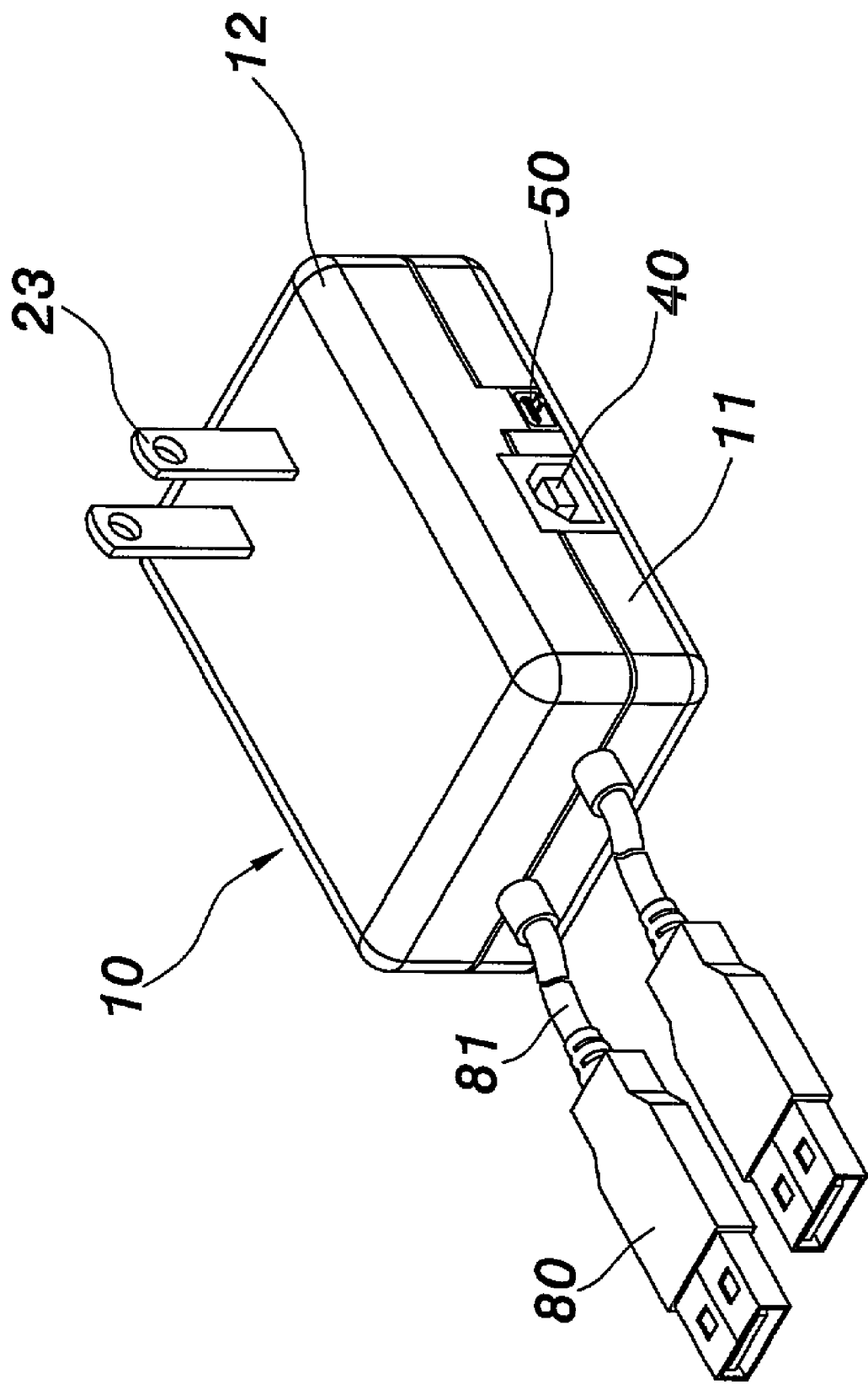
FIG. 6 is a perspective view of a second embodiment of the present invention.
Figure 7:
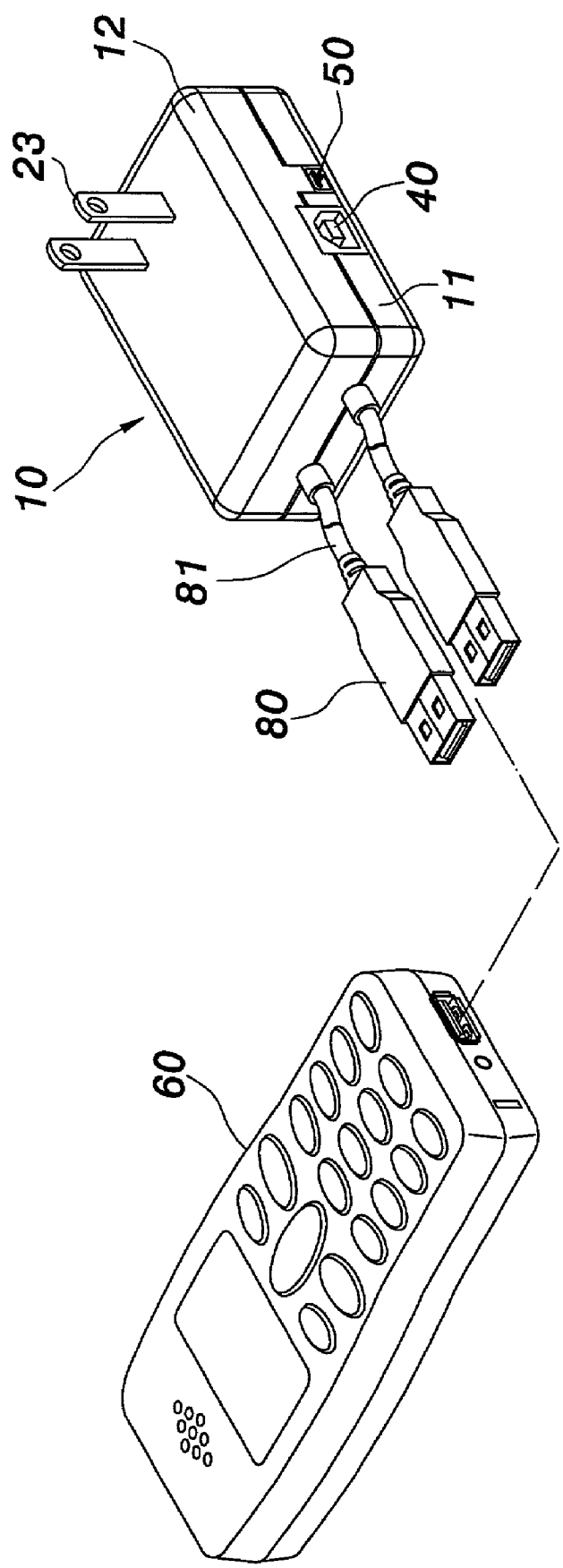
FIG. 7 shows a use state of the second embodiment of the present invention.

Please refer to FIGS. 6 and 7. The present invention can also adopt a connector 80 of male type. The connector 80 is an A-type USB connector, and achieves electric connection with the circuit board 21 via a connection cable 81. The connector 80 is connected to the output end of the transformer circuit unit 20. The connector 80 can thus directly plug with the portable electronic device 60 like a mobile phone.

Figure 8:
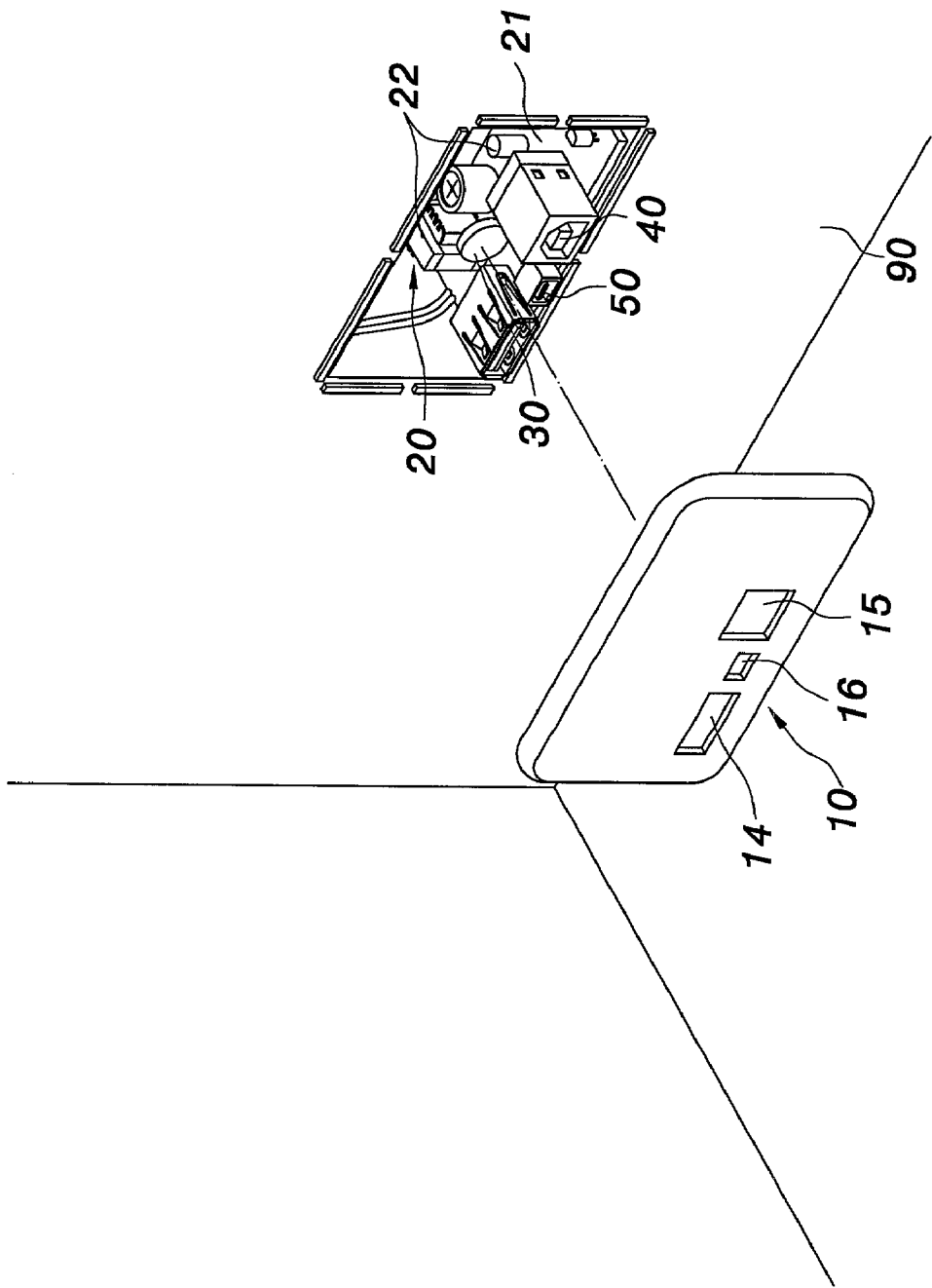
FIG. 8 is a perspective view of a third embodiment of the present invention.

Please refer to FIG. 8. The main body 10 of the present invention can be designed to be of panel shape. The transformer circuit unit 20 and the connectors 30, 40, and 50 are disposed inside the main body 10. The arrangement of the openings 14, 15, and 16 and the connectors 30, 40, and 50 can vary according to necessity. The input end of the transformer circuit unit 20 is directly connected to a 110V or 220V AC so that the transformer circuit unit 20 and the connectors 30, 40, and 50 can be disposed on a wall 90 in embedding way.

Figure 9:
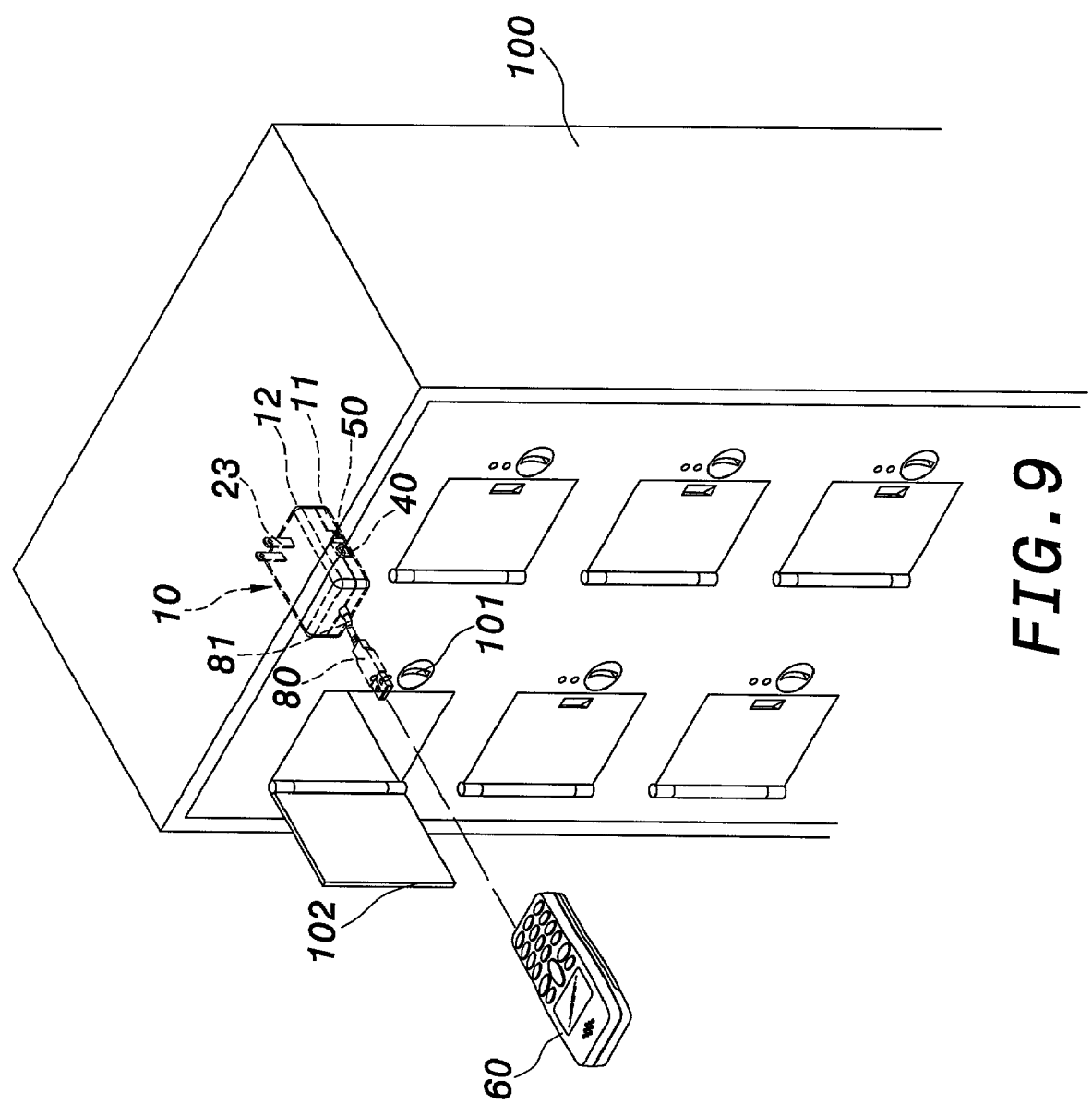
FIG. 9 is a perspective view of a fourth embodiment of the present invention.

As shown in FIG. 9, the present invention can also be disposed on a slot machine 100. The slot machine 100 has a slot 101. After a user puts in a coin, a door plank 102 will open so that the user can plug the connector 80 with the portable electronic device 60 like a mobile phone to charge it.

Figure 10:
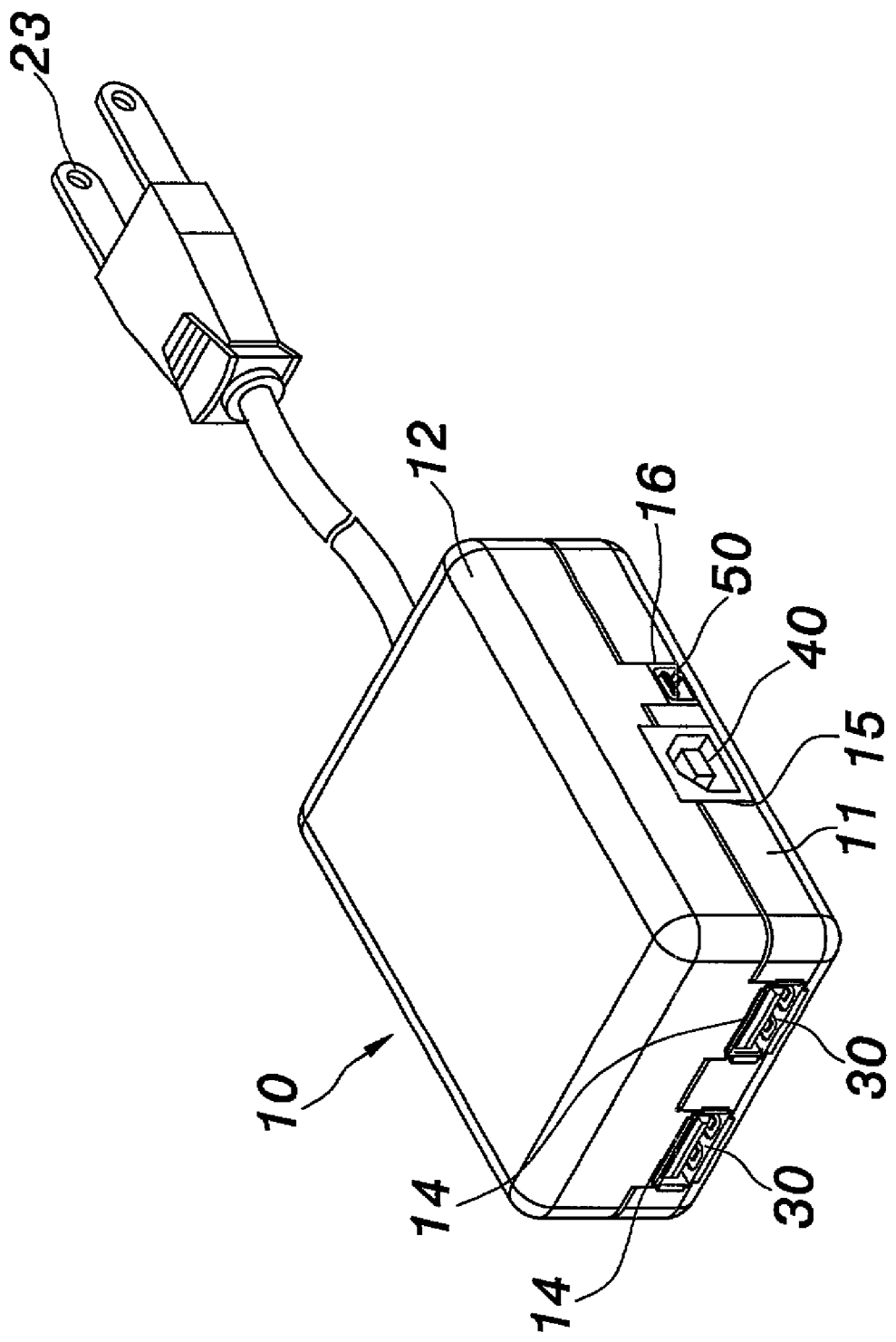
FIG. 10 is a perspective view of a fifth embodiment of the present invention.

Please refer to FIG. 10. The input end of the transformer circuit unit 20 can also be connected to the plug 23 in wiring way.

To sum up, the connectors 30, 40, and 50 of the voltage transformer of the present invention are USB connectors. The present invention can provide standard voltages to achieve the object of unified specification. Therefore, the voltage transformer needs not to have several kinds of different specifications. It is not necessary for a user to purchase several kinds of voltage transformers of different specifications, hence lessening economic burden to the user and resulting in more convenient use. Moreover, the voltage transformer of the present invention can simultaneously provide the required electricity for several portable electronic devices, hence resulting in more flexible, practical, and convenient use.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A portable universal serial bus voltage transformer, comprising:
   a main body;
   a transformer circuit unit disposed in said main body for converting power from an AC source to a DC charging voltage required for USB devices, said transformer circuit unit including a circuit board disposed within said main body, a transformer mounted to said circuit board, and a plug electrically coupled to an input of said transformer and extending from said circuit board to pass through corresponding openings in said main body for selective coupling directly to an outlet receptacle defining the AC source; and,
   a plurality of USB connectors electrically connected to an output of said transformer circuit unit for exclusive passage of said DC charging voltage provided by said transformer circuit unit therethrough, said plurality of USB connectors being operable to simultaneously connect a plurality of devices to said DC charging voltage output from said transformer circuit unit, said plurality of connectors including at least one A-type USB connector, at least one B-type USB connector, and at least one Mini-type USB connector;
   whereby DC charging power to said devices is passed through said USB connectors exclusive of concurrent data passage therethrough.

2. The portable universal serial bus voltage transformer as claimed in claim 1, wherein said main body is a hollow shell body formed by a first half body and a second half body secured together by screws.

3. The portable universal serial bus voltage transformer as claimed in claim 1, wherein said main body has a receiving space therein to receive said transformer circuit unit and said connectors.

4. The portable universal serial bus voltage transformer as claimed in claim 1, wherein said main body has openings corresponding to said connectors.

5. The portable universal serial bus voltage transformer as claimed in claim 1, wherein said transformer is a linear transformer.

6. The portable universal serial bus voltage transformer as claimed in claim 1, wherein at least one of said USB connectors is a female USB connector.

7. The portable universal serial bus voltage transformer as claimed in claim 1, wherein at least one of said USB connectors is a male USB connector.

* * * * *